(12) United States Patent
Esch et al.

(10) Patent No.: US 7,467,312 B2
(45) Date of Patent: Dec. 16, 2008

(54) ARRANGEMENT AND METHOD FOR CONTROLLING COMMUNICATION OF DATA BETWEEN PROCESSORS

(75) Inventors: Michael Esch, Nuremberg (DE); Astrid Rost, Furth (DE)

(73) Assignee: Infineon Technologies AG, Neubiberg (DE)

( * ) Notice: Subject to any disclaimer, the term of this patent is extended or adjusted under 35 U.S.C. 154(b) by 488 days.

(21) Appl. No.: 11/240,815

(22) Filed: Sep. 30, 2005

(65) Prior Publication Data

US 2006/0069934 A1      Mar. 30, 2006

(30) Foreign Application Priority Data

Sep. 30, 2004    (DE) .................. 10 2004 047 658

(51) Int. Cl.
  *G06F 1/32* (2006.01)
  *G06F 1/00* (2006.01)
  *G06F 15/16* (2006.01)
(52) U.S. Cl. .................. 713/320; 713/323; 709/208
(58) Field of Classification Search .................. 713/320, 713/323
  See application file for complete search history.

(56) References Cited

U.S. PATENT DOCUMENTS

| | | | | |
|---|---|---|---|---|
| 4,131,941 A | * | 12/1978 | Siegel et al. | ............... 709/208 |
| 5,636,341 A | * | 6/1997 | Matsushita et al. | ............ 714/13 |
| 5,867,718 A | | 2/1999 | Intrater et al. | |
| 5,915,092 A | * | 6/1999 | Morita et al. | ............... 709/213 |
| 6,279,048 B1 | | 8/2001 | Fadavi-Ardekani et al. | |

FOREIGN PATENT DOCUMENTS

| | | |
|---|---|---|
| EP | 0 677 974 A2 | 10/1995 |
| GB | 1 428 704 | 3/1976 |
| JP | 61-016373 A | 1/1986 |
| JP | 62-129654 A | 6/1987 |
| JP | 5-216793 A | 8/1993 |
| JP | 11-215043 A | 8/1999 |
| JP | 11-219239 A | 8/1999 |

* cited by examiner

*Primary Examiner*—Suresh K Suryawanshi
(74) *Attorney, Agent, or Firm*—Dickstein, Shapiro, LLP.

(57) ABSTRACT

The communication of data between two coupled processors is controlled using a ready-to-receive signal which is provided by the first processor such that it has an activated signal level or a deactivated signal level and which is used to indicate to the second processor that the first processor is or is not ready to receive data. The second processor is able to change from the awake state to a sleep state and to change back from the sleep state to the awake state. The second processor detects when the first processor changes the ready-to-receive signal from the deactivated signal level to the activated signal level while the second processor is in the sleep state and, in this case, determines that the changing of the ready-to-receive signal is a request to change to the awake state.

14 Claims, 2 Drawing Sheets

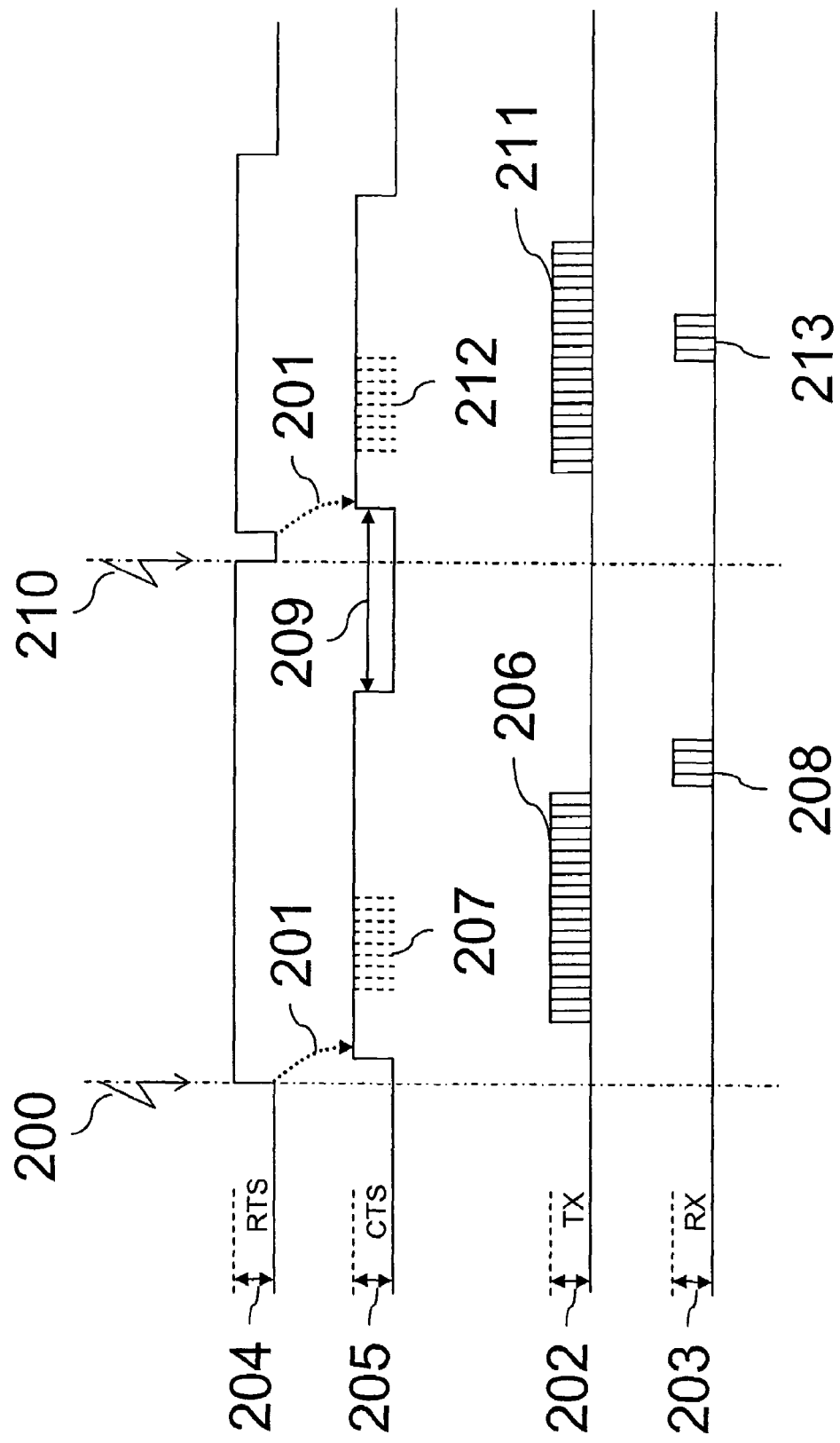

ARRANGEMENT AND METHOD FOR CONTROLLING COMMUNICATION OF DATA BETWEEN PROCESSORS

CROSS-REFERENCE TO RELATED APPLICATION

This application claims priority to German Patent Application Serial No. 10 2004 047 658.6, which was filed on Sep. 30, 2004 and is incorporated herein by reference in its entirety.

FIELD OF THE INVENTION

The invention relates to a method for controlling the communication of data between a first processor and a second processor which is coupled to the first, and relates to a dual-processor arrangement.

BACKGROUND OF THE INVENTION

Devices having a power supply that is operated by battery or rechargeable battery often operate only within discrete activity phases and bridge the times in between with power-saving phases within which many or virtually all of the components are operated without power or a clock. In the case of a microprocessor in such a device, one refers to the sleep state in the power-saving phase and to the awake state in the activity phase. If a device has a plurality of processors which are each responsible for particular functions that are separate from one another, the sleep and awake periods of the processors are, in principle, independent of one another and each processor can independently change from the awake state to the sleep state and vice versa. One example of this is a mobile radio telephone having a modem processor as an interface to the mobile radio network and an application processor as an interface to the user.

Since two processors can communicate only when both processors are in the awake state, a V.24 interface having four additional lines which are used to control the sleep and awake states is used, for example, in conventional devices (which are operated by battery or rechargeable battery) for communication between the processors. Each processor contains an additional output line, which it can use to indicate its state to the other processor, and a further output line which it can use to wake up the other processor from the sleep state. The disadvantage of this is that additional lines in the device result in a larger layout and in a greater number of layers of printed circuit boards and in larger plug connectors.

SUMMARY OF THE INVENTION

A method for controlling the communication of data between a first processor and a second processor which is coupled to the first processor. The method includes the steps of the first processor providing a ready-to-receive signal having an activated signal level or a deactivated signal level, which signal is used to indicate to the second processor that the first processor is or is not ready to receive data, the second processor being able to change from an awake state to a sleep state and to change back from the sleep state to the awake state, and the second processor detecting when the first processor changes the ready-to-receive signal from the deactivated signal level to the activated signal level while the second processor is in the sleep state and, in this case, determining that the changing of the ready-to-receive signal is a request for the second processor to change to the awake state. A dual-processor arrangement including a first processor and a second processor, a data output of the first processor being coupled to a data input of the second processor and a data output of the second processor being coupled to a data input of the first processor, and a control signal output of the first processor being coupled to a control signal input of the second processor. The first processor provides a ready-to-receive signal having an activated signal level or a deactivated signal level, which signal is used to indicate to the second processor that the first processor is or is not ready to receive data. The second processor has a state control unit which is set up to change the second processor from an awake state to a sleep state and to change it back from the sleep state to the awake state. Also, the second processor has a monitoring unit which detects when the first processor changes the ready-to-receive signal from the deactivated signal level to the activated signal level while the second processor is in the sleep state and, in this case, the state control unit determining that the changing of the ready-to-receive signal is a request to change the second processor to the awake state.

BRIEF DESCRIPTION OF THE DRAWINGS

One exemplary embodiment of the invention is explained in more detail below and is illustrated in the figures, in which:

FIG. 2 shows a sequence diagram of the temporal sequence of a method in accordance with one exemplary embodiment of the invention.

DETAILED DESCRIPTION OF PREFERRED EMBODIMENTS OF THE INVENTION

Figure 1:
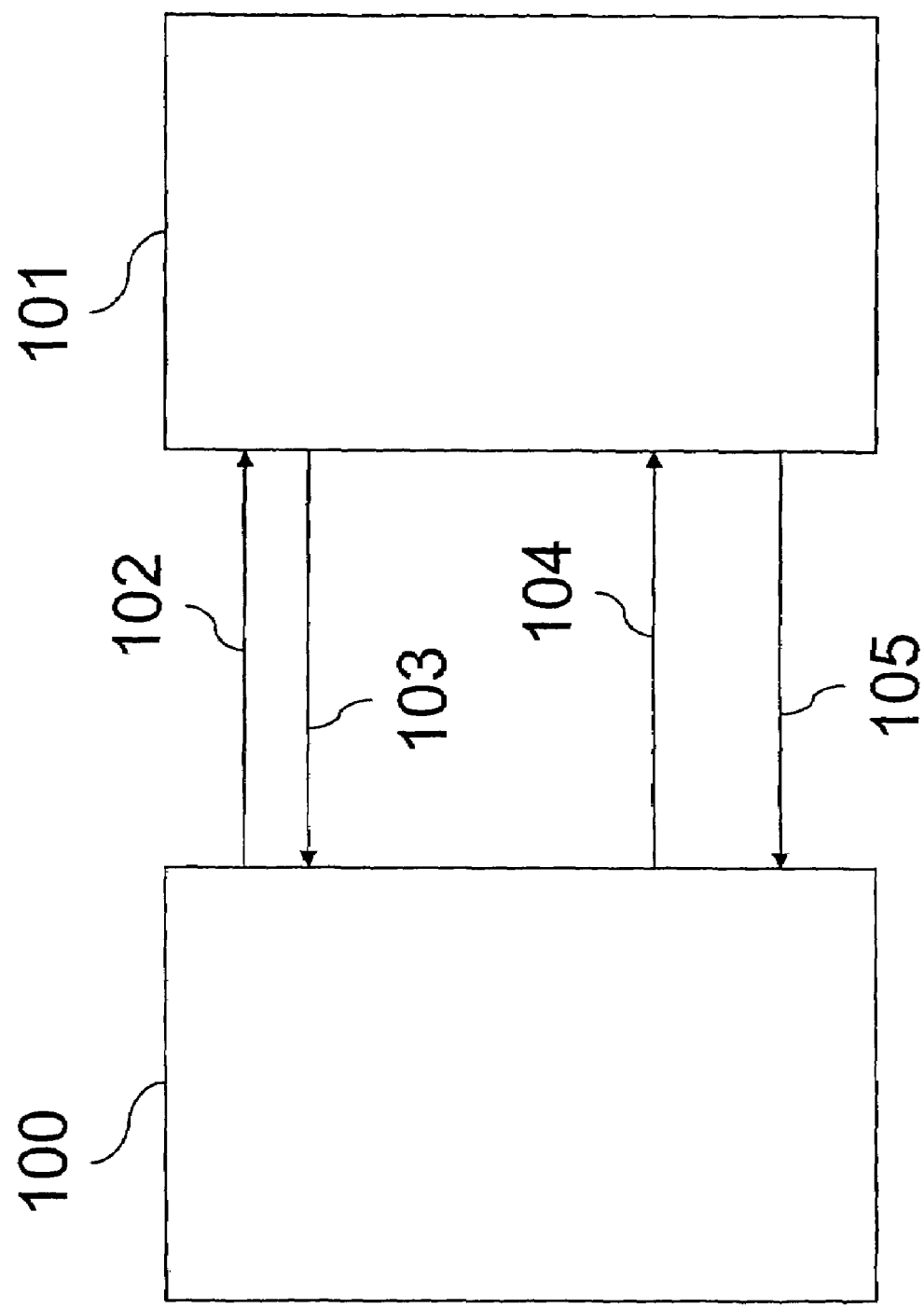
FIG. 1 shows a block diagram of a system having two coupled processors, the system being set up to carry out a method in accordance with one exemplary embodiment of the invention.

In the case of a device having a plurality of processors, the invention is based on an object of making it possible to control the sleep and awake states of the processors as required using as few additional lines as possible between the processors.

The object is achieved by means of a method for controlling the communication of data between a first processor and a second processor which is coupled to the first and a dual-processor arrangement.

In the case of a method for controlling the communication of data between a first processor and a second processor which is coupled to the first, the first processor provides a ready-to-receive signal having an activated signal level or a deactivated signal level, which signal is used to indicate to the second processor that the first processor is or is not ready to receive data. The second processor is able to change from the awake state to a sleep state and to change back from the sleep state to the awake state. The second processor detects when the first processor changes the ready-to-receive signal from the deactivated signal level to the activated signal level while the second processor is in the sleep state and, in this case, determines that the changing of the ready-to-receive signal is a request to change to the awake state.

A dual-processor arrangement has a first processor and a second processor. A data output of the first processor is coupled to a data input of the second processor and a data output of the second processor is coupled to a data input of the first processor. A control signal output of the first processor is coupled to a control signal input of the second processor. The first processor provides a ready-to-receive signal having an activated signal level or a deactivated signal level, which signal is used to indicate to the second processor that the first processor is or is not ready to receive data. The second processor has a state control unit which is set up to change the second processor from the awake state to a sleep state and to change it back from the sleep state to the awake state. The second processor has a monitoring unit which detects when the first processor changes the ready-to-receive signal from the deactivated signal level to the activated signal level while the second processor is in the sleep state and, in this case, the state control unit determines that the changing of the ready-to-receive signal is a request to change the second processor to the awake state.

The invention can clearly be seen in the fact that signals and lines which are generally required anyway for communication are used to control states and manage power. Devices having a power supply that is operated by battery or rechargeable battery often operate only within discrete activity phases and bridge the times in between with power-saving phases within which many or virtually all of the components are operated without power or a clock. In the case of a microprocessor in such a device, one refers to the sleep state in the power-saving phase and to the awake state in the activity phase. If a device has a plurality of processors which are each responsible for particular functions that are separate from one another, the sleep and awake periods of the processors are, in principle, independent of one another and each processor can independently change from the awake state to the sleep state and vice versa. One example of this is a mobile radio telephone having a modem processor as an interface to the mobile radio network and an application processor as an interface to the user.

When a signal that indicates readiness to receive data is switched to an activated signal level by the first processor, this is interpreted by the second processor, the communication partner of the first processor, as a request to wake up. A line which serves to control the flow of data during communication is used to signal a communication request.

Depending on the current status of communication, activating the same signal on the same line has a different effect: if the communication partner is in the sleep state, it is informed of a request for communication and is caused to wake up and prepare to receive data. The first processor wakes up the second processor by generating an interrupt on this line. If a communication link already exists, the first processor informs the second processor that it is ready again to receive data after a temporary interruption in the reception of data, for example on account of an input buffer threatening to overflow. The first processor resets the line to the deactivated signal level when an overflow occurs or threatens to occur and activates the signal again after the end of the overflow state. In both cases, the activated signal implicitly indicates to the second processor that the first processor is in the awake state. The second processor can use the activated line to detect whether the first processor is capable of receiving data or not. The reason for a line being reset, that is to say for a signal being deactivated, may be that the first processor is in the sleep state or an overflow state.

The invention has the advantage that a processor can signal its awake state to another processor and can wake up the other processor from the sleep state using only one additional output line. There is no need at all for an additional line if a line which is present in the communication scheme (which is used) for a ready-to-receive signal for data flow control is used to indicate the state and to signal the wake-up request.

In a first advantageous embodiment, when the first processor changes the ready-to-receive signal from the deactivated signal level to the activated signal level while the second processor is in the awake state and there are no data due to be sent by the second processor, the second processor determines that the changing of the ready-to-receive signal is a request to prepare to receive data. To express it clearly, in the awake state, the second processor interprets activation of the ready-to-receive signal by the first processor as a request to prepare to receive data, if the activation is not connected with communication that has been temporarily interrupted. If the second processor has not already been waiting for activation of the ready-to-receive signal by the first processor in order to continue transmission of data that had been temporarily interrupted, it only prepares, for its part, to receive data.

The advantage is that, in principle, the second processor does not need to be ready to receive data as soon as it is in the awake state. The first processor can also cause the second processor to establish readiness to receive. Furthermore, the first processor does not need to be concerned about whether the second processor is currently in the sleep state or is presently not ready to receive for other reasons. In these cases, the first processor can signal a communication request in the same way.

In another advantageous embodiment, the second processor provides a ready-to-receive signal having an activated signal level or a deactivated signal level, which signal is used to indicate to the first processor that the second processor is or is not ready to receive data. The first processor is able to change from the awake state to a sleep state and to change back from the sleep state to the awake state. The first processor detects when the second processor changes the ready-to-receive signal from the deactivated signal level to the activated signal level while the first processor is in the sleep state and, in this case, determines that the changing of the ready-to-receive signal is a request to change to the awake state, and/or, when the second processor changes the ready-to-receive signal from the deactivated signal level to the activated signal level while the first processor is in the awake state and there are no data due to be sent by the first processor, the first processor determines that the changing of the ready-to-receive signal is a request to prepare to receive data.

To express it clearly, the first processor is playing the role of the second processor and the second processor is playing the role of the first processor in this case. That is to say that the first processor may likewise change between the awake state and the sleep state and the second processor, for its part, activates and deactivates a ready-to-receive signal that indicates to the first processor that the second processor is or is not ready to receive data. In the sleep state, the first processor interprets activation of a ready-to-receive signal by the second processor as a request to change to the awake state. The sleep and awake states of two suitable processors can thus be mutually identically controlled in a bidirectional manner.

In one particularly advantageous embodiment of the invention, a ready-to-receive signal is transmitted using a ready-to-send (RTS) or clear-to-send (CTS) line for data flow control in accordance with the V.24 interface protocol. This is due to the fact that, in this case, the method according to the invention can be carried out by two processors (which are coupled by means of a customary V.24 interface) without the need for an additional line. In accordance with the V.24 standard, the lines RTS and CTS are intended to transmit a respective data flow control signal which can be used in the context of the invention as a ready-to-receive signal.

The invention is advantageously used if the first processor is a modem processor and the second processor is an application processor or if the first processor is an application processor and the second processor is a modem processor. Since, in these configurations, the two processors are each responsible for particular functions that are highly separate from one another, the sleep periods and the awake periods of the processors are, in principle, independent of one another and each processor can independently change from the awake state to the sleep state and vice versa.

Further advantageous embodiments of the invention are a method in which the first and/or the second processor is/are contained in a mobile radio communications device, in particular a mobile radio telephone, and a mobile radio communications device, in particular a mobile radio telephone, which contains a dual-processor arrangement according to the invention. In the case of devices of this type, there is a particular need to manage power effectively and reduce the number of lines within the devices.

FIG. 1 partially illustrates a dual-processor arrangement. In accordance with the exemplary embodiment, it is part of a mobile radio telephone having an application processor 100 and a modem processor 101. The two processors are coupled using a V.24 interface, only four lines of which are illustrated here. Single-headed arrows symbolize the transmission signal line TX 102, the reception signal line RX 103, the line for data flow control RTS 104, which transmits the ready-to-receive signal of the application processor 100 to the modem processor 101, and the line for data flow control CTS 105, which transmits the ready-to-receive signal of the modem processor 101 to the application processor 100.

Three cases are distinguished below on the basis of whether, in the starting situation, the signals on the lines 104 and 105 are activated or deactivated. In this case, for the sake of simplicity, the method sequence is not described in all possible variants. In particular, the sleep and awake states of the processors are controlled in a bidirectional manner in the exemplary embodiment, whereas the sequence is sometimes explained only with reference to a unidirectional example. In the exemplary embodiment, the deactivated signal level is realized in the form of an electrical voltage level of virtually zero volts and the activated signal level is realized in the form of an electrical voltage level which is significantly different than zero volts.

Case 1: The signals on both lines RTS 104 and CTS 105 are activated.

This is the initial state after the system has been switched on. Both processors are active and ready to receive data. If the level of the input buffer of a processor reaches a prescribed threshold and threatens to overflow, the processor in question temporarily deactivates the signal (which indicates that the processor is ready to receive) on the line RTS 104 or CTS 105. The transmitting processor then temporarily interrupts data transmission. As soon as the input buffer of the receiving processor can receive data again, the signal on the line RTS 104 or CTS 105 is activated again and data transmission can be continued.

In a time phase in which the two processors are not communicating, each processor can change to the sleep state independently of the other processor. If, for example, the modem processor 101 is to be changed to the sleep state, it deactivates the signal on the line CTS 105 in order to indicate to the application processor 100 that it is no longer ready to receive data. After a short waiting time in order to give the application processor 100 time to react to the signal on the line CTS 105 being switched off, the modem processor 101 changes to the sleep state.

Case 2: The signals on both lines for data flow control RTS 104 and CTS 105 are deactivated.

The two processors 100 and 101 can change to the sleep state independently of one another and can change back to the awake state again independently of one another. This can be initiated, in a processor, by means of an internal or external trigger or an event, in the case of which it would not be necessary to also wake up the other processor. In this case, a processor which has changed back to the awake state leaves its ready-to-receive signal at the deactivated signal level. By way of example, in this case, the application processor 100 is in the awake state again after a previous sleep phase and the signal on the line RTS 104 (which is assigned to the processor in order to indicate that it is ready to receive) is still deactivated.

If the application processor 100 would now like to initiate communication, it activates the signal on the line RTS 104. If the modem processor 101 is presently in the sleep state, it determines that activation of the signal on the line RTS 104 is a request to change to the awake state and activates itself. To state it clearly, it wakes up. As soon as the modem processor 101, for its part, is ready to receive data, it activates the signal on the line CTS 105, and data transmission between the two processors can begin. If, at the point in time at which the signal on the line RTS 104 changes to the active state, the modem processor 101 is already in the awake state again after a previous sleep phase, it determines that activation of the signal on the line RTS 104 is a request to prepare to receive data. As soon as it is actually ready to receive, it activates the signal on the line CTS 105, and communication can begin.

Case 3: One of the two signals on the lines RTS 104 and CTS 105 is activated and the other is deactivated.

By way of example, the application processor 100 is in the awake state and has activated its ready-to-receive signal on the line RTS 104. The modem processor 101 is in the sleep state or is in the awake state again after a temporary sleep phase and has deactivated its ready-to-receive signal on the line CTS 105.

If the application processor 100 would now like to initiate communication, it wakes up the modem processor 101 by switching the signal on the line RTS 104 from the active state to the inactive state and switching it back to the active state again. The last change of the signal on the line RTS 104, from the inactive state to the active state, is determined by the modem processor 101 to be a request to change to the awake state or, if the modem processor is already in the awake state, a request to prepare to receive data. As soon as the modem processor 101 is ready to receive data, it activates the signal on the line CTS 105, and communication can begin.

If, in the case of the starting situation described in case 3 here, the modem processor 101 whose ready-to-receive signal on the line CTS 105 is deactivated would like to begin communication, there are two possibilities: firstly, the modem processor 101 can first of all activate the signal on the line CTS 105, which can be ignored by the application processor 100 since the latter is already ready to receive. Alternatively, the modem processor 101 can simply transmit its data to the application processor 100 since the latter has already used an activated signal on the line RTS 104 to indicate that it is ready to receive. If the application processor 100 would then like to transmit data back to the modem processor 101 in response, it switches the signal on the line RTS 104 from the active state to the inactive state and back to the active state again in order to signal to the modem processor 101 that the latter is to change to the awake state or is to establish readiness to receive data. As soon as the modem processor 101 then activates the signal on the line CTS 105, communication can be continued.

FIG. 2 illustrates, in the form of a sequence diagram, the temporal profile of the signals on the four lines of the dual-processor system (shown in FIG. 1) for a few method steps in accordance with the exemplary embodiment. In the horizontal direction of the diagram, the time is plotted from left to right and, in the vertical direction of the diagram, the signal levels are each plotted separately for the individual lines. Low signal levels are illustrated further down in the vertical direction of the diagram and high signal levels are illustrated further up in the vertical direction of the diagram. The deviation in the signal level between a low deactivated signal level and a high activated signal level and the signal on a line are symbolized by a respective double-headed arrow for the signal TX 202 on the line TX 102 (see FIG. 1), for the signal RX 203 on the line RX 103, for the signal RTS 204 on the line RTS 104 and for the signal CTS 205 on the line CTS 105. As the starting situation, all of the signals are deactivated, that is to say that the low deactivated signal levels are applied to the lines.

At a point in time marked by the first event symbol 200, the application processor 100 activates the signal RTS 204. The modem processor 101 which is in the sleep state at that point in time detects this change in the ready-to-receive signal RTS 204, determines that it is a request to change to the awake state and changes to the awake state. As soon as the modem processor 101 is ready to receive data from the application processor 100, it activates the signal CTS 205. The wake-up process is represented by a dotted arrow 201.

The application processor 100 transmits a first sequence of data packets 206 to the modem processor 101 via the line TX 102. This results in a first activity phase 207 of data flow control. On account of an overflow situation in the input buffer of the modem processor 101, the ready-to-receive signal CTS 205 is deactivated several times for respectively short intervals of time, with the result that the application processor 100 respectively interrupts transmission of the first sequence of data packets 206 in these short intervals of time and respectively starts transmission again after the signal CTS 205 has returned to the activated signal level. The modem processor 101 then transmits a second sequence of data packets 208 to the application processor 100 via the line RX 103. In order to simplify the diagram, the latter does not show that, when transmitting data via the line RX 103, an activity phase of data flow control can occur in an analogous manner, the ready-to-receive signal RTS 204 of the application processor 100 being temporarily deactivated one or more times during the activity phase.

After a period of time has elapsed without data having been communicated between the two processors, the modem processor 101 changes the signal CTS 205 to the deactivated signal level and changes to the sleep state. The time phase without readiness to receive 209 on the line TX 102 begins earlier and ends later than the sleep state of the modem processor 101 since the application processor 100 is to be given time to react to the signal on the line CTS 105 being switched off, and the modem processor 101 requires time for the operation of changing back to the awake state and restoring readiness to receive.

At a point in time marked by the second event symbol 210, the application processor 100 would like to begin to communicate with the modem processor 101. Since the application processor 100 uses the deactivated signal CTS 205 to detect that the modem processor 101 is not ready to receive, the application processor 100 first of all switches the signal RTS 204 from the activated signal level to the deactivated signal level and then back to the activated signal level again. The modem processor 101 detects the changing of the ready-to-receive signal RTS 204 to the activated signal level, determines that it is a request to change to the awake state and changes to the awake state. As soon as the modem processor 101 is ready to receive data on the line TX 102, it activates the ready-to-receive signal CTS 205 and the time phase without readiness to receive 209 is ended.

The application processor 100 then transmits a third sequence of data packets 211 to the modem processor 101 via the line TX 102. This results in a second activity phase 212 of data flow control, in which activity phase the ready-to-receive signal CTS 205 is deactivated several times for respectively short intervals of time on account of an overflow situation in the input buffer of the modem processor 101. While the third sequence of data packets 211 is being transmitted via the line TX 102, the modem processor 101 transmits a fourth sequence of data packets 213 to the application processor 100 in a parallel manner via the line RX 103. After a period of time has elapsed without data having been communicated between the two processors, the modem processor 101 deactivates the signal CTS 205 and changes to the sleep state. Somewhat later, the application processor 100 changes the signal RTS 204 to the deactivated signal level and changes to the sleep state.

What is claimed is:

1. A method for controlling communication of data between a first processor and a second processor which is coupled to the first processor, the method comprising:

the first processor providing a ready-to-receive signal having an activated signal level or a deactivated signal level, which signal is used to indicate to the second processor that the first processor is or is not ready to receive data;

the second processor being able to change from an awake state to a sleep state and to change back from the sleep state to the awake state; and the second processor detecting when the first processor changes the ready-to-receive signal from the deactivated signal level to the activated signal level while the second processor is in the sleep state and, in this case, determining that the changing of the ready-to-receive signal is a request for the second processor to change to the awake state.

2. The method as claimed in claim 1, wherein, when the first processor changes the ready-to-receive signal from the deactivated signal level to the activated signal level while the second processor is in the awake state and there are no data due to be sent by the second processor, the second processor determines that the changing of the ready-to-receive signal is a request to prepare to receive data.

3. The method as claimed in claim 1, further comprising:

the second processor providing a ready-to-receive signal having an activated signal level or a deactivated signal level, which signal is used to indicate to the first processor that the second processor is or is not ready to receive data;

the first processor being able to change from the awake state to a sleep state and to change back from the sleep state to the awake state;

the first processor detecting when the second processor changes the ready-to-receive signal from the deactivated signal level to the activated signal level while the first processor is in the sleep state and, in this case, determining that the changing of the ready-to-receive signal is a request to change to the awake state; and/or when the second processor changes the ready-to-receive signal from the deactivated signal level to the activated signal level while the first processor is in the awake state and there are no data due to be sent by the first processor, the first processor determining that the changing of the ready-to-receive signal is a request to prepare to receive data.

4. The method as claimed in claim 1, wherein a ready-to-receive signal is transmitted using a ready-to-send or clear-to-send line for data flow control in accordance with the V.24 interface protocol.

5. The method as claimed in claim 1, wherein the first processor is a modem processor and the second processor is an application processor.

6. The method as claimed in claim 1, wherein the first processor is an application processor and the second processor is a modem processor.

7. The method as claimed in claim 1, wherein the first processor and/or the second processor is/are contained in a mobile radio telephone.

8. A dual-processor arrangement comprising:
a first processor and a second processor;
a data output of the first processor being coupled to a data input of the second processor and
a data output of the second processor being coupled to a data input of the first processor; and
a control signal output of the first processor being coupled to a control signal input of the second processor,
wherein the first processor is set up to provide a ready-to-receive signal having an activated signal level or a deactivated signal level, which signal is used to indicate to the second processor that the first processor is or is not ready to receive data,
wherein the second processor has a state control unit which is set up to change the second processor from an awake state to a sleep state and to change it back from the sleep state to the awake state, and
wherein the second processor has a monitoring unit which is set up to detect when the first processor changes the ready-to-receive signal from the deactivated signal level to the activated signal level while the second processor is in the sleep state and, in this case, the state control unit is set up to determine that the changing of the ready-to-receive signal is a request to change the second processor to the awake state.

9. The dual-processor arrangement as claimed in claim 8, wherein the first processor is a modem processor and the second processor is an application processor.

10. The dual-processor arrangement as claimed in claim 8, wherein the first processor is an application processor and the second processor is a modem processor.

11. The dual-processor arrangement as claimed in claim 8, wherein, when the first processor changes the ready-to-receive signal from the deactivated signal level to the activated signal level while the second processor is in the awake state and there are no data due to be sent by the second processor, the second processor is set up to determine that the changing of the ready-to-receive signal is a request to prepare to receive data.

12. A mobile radio telephone having a dual-processor arrangement as claimed in claim 8.

13. The method as claimed in claim 1, further comprising:
the first processor changing the ready-to-receive signal from the activated signal level to the deactivated signal level, thereby indicating an overflow situation; and
the second processor interrupting data transmission in response to the changing of the ready-to-receive signal from the activated signal level to the deactivated signal level.

14. The dual-processor arrangement of claim 8, wherein:
the first processor is further set up to change the ready-to-receive signal from the activated signal level to the deactivated signal level, thereby indicating an overflow situation; and
the monitoring unit of the second processor is further set up to detect when the first processor changes the ready-to-receive signal from the activated signal level to the deactivated signal level, and to interrupt data transmission in response to thereto.

\* \* \* \* \*